US012763067B2

(12) United States Patent
Olatunji

(10) Patent No.: US 12,763,067 B2
(45) Date of Patent: Oct. 13, 2026

(54) SYSTEM AND METHOD FOR ENCODING AND TRANSCODING AUDIO DATA COMPRISING LANGUAGE, ACCENT, DOMAIN SPECIFIC COMPONENTS

(71) Applicant: Oloruntobiloba Tolulope Olatunji, Grand Blanc, MI (US)

(72) Inventor: Oloruntobiloba Tolulope Olatunji, Grand Blanc, MI (US)

( * ) Notice: Subject to any disclaimer, the term of this patent is extended or adjusted under 35 U.S.C. 154(b) by 212 days.

(21) Appl. No.: 18/355,166

(22) Filed: Jul. 19, 2023

(65) Prior Publication Data

US 2025/0029597 A1 Jan. 23, 2025

Related U.S. Application Data

(60) Provisional application No. 63/364,990, filed on May 19, 2022.

(51) Int. Cl.
*G10L 15/06* (2013.01)
*G10L 15/16* (2006.01)

(52) U.S. Cl.
CPC ............ *G10L 15/063* (2013.01); *G10L 15/16* (2013.01); *G10L 2015/0631* (2013.01)

(58) Field of Classification Search
CPC .................. G10L 15/063; G10L 15/16; G10L 2015/0631
See application file for complete search history.

(56) References Cited

U.S. PATENT DOCUMENTS

| | | | | |
|---|---|---|---|---|
| 6,049,766 A * | 4/2000 | Laroche | G10L 21/01 704/503 |
| 7,174,296 B2 | 2/2007 | Bartosik | |
| 9,472,187 B2 | 10/2016 | Kapralova et al. | |
| 9,552,809 B2 | 1/2017 | Yegnanarayanan et al. | |
| 9,934,786 B2 | 4/2018 | Miglietta et al. | |

(Continued)

OTHER PUBLICATIONS

Pratap, Massively Multilingual ASR: 50 Languages, 1 Model, 1 Billion Parameter, 2020, arXiv, whole document (Year: 2020).*

(Continued)

*Primary Examiner* — Sonia L Gay
(74) *Attorney, Agent, or Firm* — The Rapacke Law Group, P.A.; Andrew S. Rapacke; Kenneth F. Brooks

(57) ABSTRACT

A method of training a transcoder algorithm using audio samples having high resource and low resource language components. The method includes evaluating batches of audio samples based on accent, dialect, accented and language specific domain, accented and language specific subdomain, dialect and language specific domain, dialect and language specific subdomain, or combinations thereof. The method includes up-sampling audio samples having at least one language component from the group and adding the up-sampled audio samples to the batches of audio samples. The method includes generating hidden representations using a pre-trained neural network, measuring differences of delta between predictions and true labels from metadata and predicting a score for each task. The method also includes comparing the predicted score to a true label from the metadata of each audio and tuning the parameter space of the transcoder algorithm based on the comparison between the predicted score and the known score.

6 Claims, 7 Drawing Sheets

10

(56) References Cited

U.S. PATENT DOCUMENTS

| | | | | |
|---|---|---|---|---|
| 10,468,016 | B2 | 11/2019 | Jaramillo et al. | |
| 10,658,074 | B1 | 5/2020 | Sorkey et al. | |
| 10,733,976 | B2 | 8/2020 | Coifman | |
| 10,810,995 | B2 | 10/2020 | Flaks et al. | |
| 10,860,685 | B2 | 12/2020 | Co et al. | |
| 10,971,153 | B2 | 4/2021 | Thomson et al. | |
| 11,170,782 | B2 | 11/2021 | Stoker et al. | |
| 11,335,324 | B2 | 5/2022 | Biadsy et al. | |
| 11,341,972 | B2 | 5/2022 | Gruenstein et al. | |
| 11,404,049 | B2 | 8/2022 | Nguyen et al. | |
| 11,468,897 | B2 | 10/2022 | Wyss et al. | |
| 11,482,213 | B2 | 10/2022 | Raghunathan et al. | |
| 11,557,289 | B2 | 1/2023 | Biadsy et al. | |
| 12,112,752 | B1 * | 10/2024 | Gupta | G10L 15/08 |
| 2018/0143974 | A1 | 5/2018 | Skarbovsky et al. | |
| 2020/0143820 | A1 * | 5/2020 | Donofrio | G06F 3/165 |
| 2020/0160836 | A1 * | 5/2020 | Chen | G10L 15/005 |
| 2020/0403818 | A1 * | 12/2020 | Daredia | G10L 17/00 |
| 2021/0074277 | A1 | 3/2021 | Lewis | |
| 2021/0089887 | A1 * | 3/2021 | Johnson | G06N 3/084 |
| 2022/0059083 | A1 * | 2/2022 | Muller | G10L 15/063 |
| 2022/0092404 | A1 * | 3/2022 | O'Connor | G06F 18/214 |
| 2022/0122581 | A1 * | 4/2022 | Chen | G06N 3/047 |
| 2022/0230641 | A1 | 7/2022 | Do | |
| 2023/0196567 | A1 * | 6/2023 | Aykut | G06N 3/0455<br>382/128 |

OTHER PUBLICATIONS

Thai, Synthetic Data Augmentation for Improving Low Resoure ASR, 2019, IEEE, whole document (Year: 2019).*

* cited by examiner

500

SYSTEM AND METHOD FOR ENCODING AND TRANSCODING AUDIO DATA COMPRISING LANGUAGE, ACCENT, DOMAIN SPECIFIC COMPONENTS

CROSS REFERENCE TO RELATED APPLICATION

This application claims priority to U.S. Provisional Application No. 63/364,990, filed May 19, 2022, the contents of which are incorporated herein by reference.

BACKGROUND

The present disclosure relates to computing models and speech analysis, more particularly, to machine learning, computing models, speech recognition, control systems, and audio sampling.

Wav2vec is a speech recognition system that uses one or more speech recognition models, including a trained neural network parameterized using self-supervised training techniques, to predict, recognize, or both language units in speech audio data and encode the language units into their digital representations. Alexei Baevski, Henry Zhou, Abdelrahman Mohamed, Michael Auli (2020). wav2vec 2.0: A Framework for Self-Supervised Learning of Speech Representations, arXiv: 2006.11477v3 [cs.CL]. https://doi.org/10.48550/arXiv.2006.11477.

Wav2vec is a base system that uses an unsupervised machine learning model that is more cost effective yet as technically effective as systems that use semi-supervised machine learning models. However, the wav2vec and commercially available systems that use wav2vec as their base component are limited in their utility due to a lack of features and refinement.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Physicians and clinicians work together in providing care for patients. Clinicians also keep and maintain clinical documentation. Records keeping and maintenance can be performed using traditional data entry systems. However, data entry can be a time consuming, laborious task that often results in clinical documentation with recording errors, missing records, and incomplete records.

Clinicians are relied upon more in certain parts of the world due to a shortage of doctors. In Africa, e.g., the doctor to patient ratio is one in 5,000. African clinicians are required to do more in providing patient care and, as such, have less time to spend in performance of administrative duties, such as records keeping and maintenance. Prior art Automated speech transcription systems could be used to complement or replace data entry systems. However, these systems have limitations that also result in clinical documentation with recording errors, missing records, and incomplete records.

A problem with automated speech transcription systems is their inability to detect accents in audio of a spoken language. Another problem with automated speech transcription systems is their inability to detect accented and domain specific terms in audio of a spoken language.

In Africa, there are six linguistic families, 2,000 distinct languages, and around 8,000 dialects spoken. English has several linguistic families and several dialects for each family. With each dialect, African or English, there are regional and individual styled accents. As previously stated, prior art automated speech transcription systems are limited in their transcription abilities due to the lack of features necessary to transcribe audio data comprising accented and accented and domain related components.

Presented herein is a system and method for encoding and transcoding audio data comprising accented and accented and domain related language components into text. The system and method comprise a language translator and transcriber algorithmic model system configured to process speech audio data, translate speech components, and transcribe the speech components. The speech components are translated into their digital word representations, digital domain specific representations, and digital accent representations using a dictionary of words and words known to be used in physician, clinician, or both practice areas. The digital representations are transcribed into a printable format using, e.g., an ASCIII table.

System Application—Block Diagram

Figure 1:
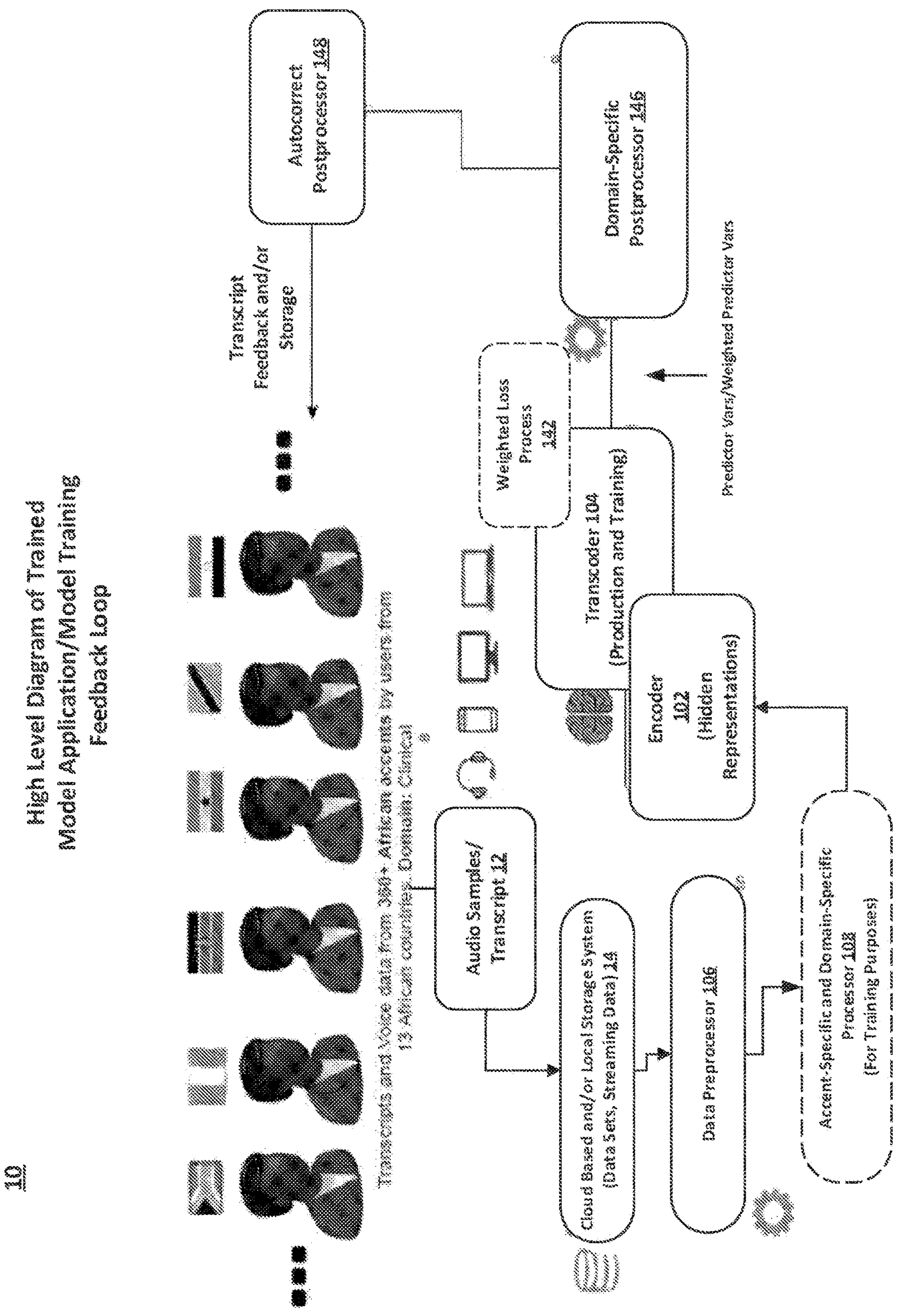
FIG. 1 illustrates a high-level block diagram of a system application for encoding and transcribing audio samples and transcripts in a production setting, and for training a mathematical algorithm using a training dataset in a testing and validation setting, according to an example embodiment.

FIG. 1 is an illustration of a high-level block diagram of a system application 10 for encoding and transcribing audio samples and transcripts in a production setting, and for training a mathematical algorithm using a training dataset in a testing and validation setting, according to example embodiments. In the first embodiment, system application 10 encodes accented audio samples and transcodes the encoded multi-part components into standard, text data format using a trained algorithmic model having a parameter space configured to compensate transcoding based on detected accent and domain. In the second embodiment, system application 10 uses a training dataset, a test dataset, a validation dataset, and a statistical based mathematical algorithm to develop a parameter space that can process audio samples, transcripts, or both, detect language components, determine an accent associated with one or more of the language components, and transcode the detected language components into a standard, text data format.

In FIG. 1, solid-lined figure objects, or components, i.e., figure objects that do not include the dashed-lined (optional) figure objects, are determinative of the production setting. Solid-lined figure objects, or components, and figure objects that do include the dashed-lined figure objects, are determinative of the training, testing, and validation setting.

In the first embodiment, system application 10 is configured to comprise storage system 14, data preprocessor 106, encoder 102, transcoder 104, domain-specific postprocessing module 146, and autocorrect postprocessing module 148.

Storage system 14 can store algorithms, models, datasets of audio recordings, audio samples, true accents, true dialects, accents, dialects, transcripts, knowledge bases, historical references, and corpora.

Data preprocessor 106 can be configured to detect user configurations, such as tuning parameters or domain specifications, and detect voice activity. Data preprocessor 106 can normalize audio, suppress noise in audio samples, boost volume, augment data, or any combination thereof, of components detected in audio samples.

Encoder 102 applies feature learning techniques and hidden layers of a neural network to automatically learn a character or character set from the audio samples generated by data preprocessor 106. Hidden representations are the features detected by the hidden layers of the neural network. Wav2vec 2.0 is an example of a system of trained algorithmic models that can be used to generate hidden representations. The hidden representations can be d-dimensional vectors of real numbers representing encodings of audio samples.

Transcoder 104 applies an accent predictor model and a domain predictor model to generate accent and domain predictions. Accent predictions, domain predictions, and hidden representations are dynamically combined using Learnable Accent Adapter 132. Transcoder 104 applies a classification layer to predict language component parts in the combined predictions.

Domain-specific postprocess 146 generates domain-specific documentation based on predicted language component parts. Autocorrect postprocess 146 checks for and corrects transcription errors based on the domain specific documentation, the normalized, weighted, and combined predictions selected or predicted domain, subdomain, or both specific languages and a text corpus.

In the second embodiment, system application 10 is configured to comprise storage system 14, data preprocessor 106, up-sample process module 108, encoder acoustic (statistical based) algorithm 102*b*, transcoder language (statistical based) algorithm 104*b*, weighted loss process 142, domain-specific postprocess module 146, and autocorrect postprocess module 146.

Storage system 14 can be a cloud-based system, local based system, or both, and process data using distributed computing technology, parallel computing technology, multicore computing technology, single core computing technology, or any combination thereof. Storage system 14 can store algorithms, models, datasets of audio recordings, audio samples, true accents, true dialects, accents, dialects, transcripts, knowledge bases, historical references, and corpora.

Data preprocessor 106 can be configured to detect user configurations, such as tuning parameters or domain specifications, and detect voice activity. Data preprocessor 106 can normalize audio, suppress noise in audio samples, boost volume, augment data, or any combination thereof, of components detected in audio samples.

Up-sample process module 108 can be configured for operation in three different modes using three separate algorithms. In the first mode, up-sample process module 108 uses an accent pairing algorithm to increase minority accent representation, improving ASR performance to match majority accent performance. The accent pairing algorithm creates new samples based on a set of accent-based pairing rules. In the second mode, up-sample process module 108 uses a minibatching algorithm. As an example, this selects samples (determines the composition of each minibatch) based on the relative amounts of accents in the training data, ensuring minority accents are represented in each minibatch during training. In the third mode, the accent-driven curriculum learning algorithm is used to determine the order of accents in each training epoch. Majority accents are sampled in earlier epochs, while minority accents are introduced in later epochs.

Encoder acoustic model 102 applies feature learning techniques and hidden layers of a neural network to automatically learn a character or character set from the audio samples generated by up-sample process module 108. Hidden representations are the features detected by the hidden layers of the neural network. Wav2vec 2.0 is an example of a system of statistical based algorithmic models that can be used to generate hidden representations. The hidden representations can be d-dimensional vectors of real numbers representing encodings of audio samples.

Transcoder model 104 applies an accent predictor model and a domain predictor model to generate accent and domain predictions. Accent predictions, domain predictions, and hidden representations are added together and weighted using matrix multiplication. The combined predictions are weighted using an attention module or a fully connected module followed by a softmax normalization layer. The softmax normalization layer uses a normalized exponential function to normalize the weighted combined predictions. Transcoder 104 applies a classification layer to predict the text [character set, letters, numbers, punctuations, etc.] based on the output of the matrix multiplication.

Domain-specific postprocess 146 generates domain-specific documentation based on predicted language component parts. Autocorrect postprocess 146 checks for and corrects transcription errors based on the domain specific documentation, the normalized, weighted, and combined predictions selected or predicted domain, subdomain, or both (domain, subdomain) specific languages and a text corpus.

Practical Application of System

African clinicians that speak English as a second language can keep and maintain clinical documentation by using digital media and an audio recording system. System application 10 can encode audio samples and transcribe encoded data having African accented and African accented and domain and/or subdomain related language components into text using encoder 102, transcoder 104, and auxiliary modules 106, 146, and 148.

An African clinician can use the system and method so that more time can be spent on a patient's primary care and not on recording and maintaining clinical documentation using traditional data entry methods and not on prior art systems that do not interpret and transcribe adequately for those who speak English as a second language, have accents, and heavily rely on the use of domain specific language.

Furthermore, system application 10 improves the quality of transcribed audio samples by detecting and removing errors introduced into a transcoding process due to misinterpreted characters of a spoken language. System application 10 improves the quality of transcribed audio samples by correcting component parts of encoded audio samples based on a predicted accent, domain, or both.

General Terms and Definitions

Audio sample components, e.g., C1 through C7, as used herein, can refer to language components. Language components can refer to character(s) of a character set, e.g., an international standardized character set, such as ASCII. Characters can include token(s), number(s), symbol(s), letter(s), syllable(s), consonant(s), vowel(s), word(s), phrase(s), sentence(s), and paragraph(s). Proc, as used herein, can be a process identifier associated with an OS's active process, domain term, sub-domain term, or key words, tokens, or symbols that can be used to correlate transcribed components. A proc can also include a timestamp, epoch, or both.

Low resource language, as used herein, means a spoken language, e.g., Hausa which is primarily spoken in Nigeria and Niger, that is infrequently used in a particular region, such as the United States (US), or in a particular setting, such as the US medical clinics. Nigerians, e.g., may speak with a style of pronunciations that is uncommon or infrequently heard, making understanding of the spoken and accented speech, with or without a particular dialect, difficult to interpret. As an example, Africans, such as Nigerian, Ethiopian, and Eutherian, may speak English as a second language and with an accent that makes interpretation difficult. In a professional setting, such as the medical field, the difficulty can be very problematic.

The spoken language can include domain terms and domain specific language and sub-domain terms and sub-domain specific language. A domain term relates to and broadly defines a particular industry, practice, expertise, skill set, etc. A sub-domain term relates to and broadly defines branches or focus areas of a domain. Domain terms and sub-domain terms can be classes, categories, or both that can be used to index domain and sub-domain specific language.

Medical is an example of a clinical term that can be classified as a domain. Pediatrics, geriatrics, dental surgery, internal medicine, oncology, radiology, obstetrics, gynecology, pathology, pharmacology, surgery, nursing, human anatomy, human physiology, laboratory medicine, embryology, and ultrasonography are examples of medical terms that can be classified as a domain. Legal is an example of an administrative term that can be classified as a sub-domain of the domain law. The sub-domain legal can have its own sub-domain of terms, such as commercial law, property law, common law, criminal law, and international law.

A corpus can comprise parameter and value pairs for categories (domains, non-domains), classes (subdomains, non-subdomains), language components, and proc. A corpus can also comprise rules for filtering and categorizing, classifying, and indexing the parameter and value pairs. A corpus can comprise domain specific transcripts, sub-domain specific transcripts, non-domain related transcripts, training dataset(s), testing dataset(s), and validation dataset(s). Transcripts can comprise (no accent, dialect, both) language transcribed from audio samples that included language components having no or negligible accent, dialect, or both. Transcripts can comprise language transcribed from (accent with or without dialect) audio samples that included spoken language having accent, dialect, or both.

A corpus can comprise training data, testing data, and validation data generated from select parameter and value pairs. A corpus can comprise one or more knowledge bases. Knowledge bases can be based on historical information, e.g., from transcripts for a particular time frame. Knowledge bases can comprise a large dataset of known sentences.

Module, as used herein, can refer to software and/or hardware-based instructions, mathematical operations, or both that that integrate with other software components of a system application that when executed by a computer or computing device performs various methods, processes, and functions described herein.

System application, as used herein, refers to software instructions that can be installed at a local machine level, network level, or both, and executed by a computing device at the kernel level, application level, or both of a desktop, network server, or both.

Algorithm, as used herein, is an application-specific set of rules, processes, instruction sets, or any combination thereof that when executed by a computing device perform calculations, problem-solving operations, or both.

Model, or algorithmic model, as used herein is an application specific artefact or file that has been trained to recognize specific patters, rules, processes, or both followed by a computing device that executes the model operations and returns a decision or prediction.

Training dataset, as used herein, is a dataset comprising various variables (parameter, value(s) configuration), such as language specific domains, language specific sub-domains, prediction scores, distribution scores, outcome variables, independent variables, and dependent variables. The validation dataset is used during training and comprises known variables. It is used as a benchmark for the training dataset.

The test dataset is a separate set of audio and transcript pairs used to estimate model performance on new samples as a proxy for production performance.

All datasets (train, validation, test) also contain true domain and accent information as well as other characteristics about the speaker and the domain.

In a practical application, training can occur over multiple epochs. During training, audio samples are input to encoder model 102 and hidden representations are input to Transcoder 104. Predicted transcripts generated by transcoder 104 are compared to the true transcripts for the training set. The parameter space of the encoder 102, transcoder 104, or both are tuned based on the comparison.

At the end of each training epoch, training can be paused and the trained models for encoder 102 and transcoder 104 evaluated against the validation dataset to measure progress on a set of audios and transcripts separate from the training set.

The validated audio samples are fed into encoder model 102 and its predictions are compared with true actual transcripts in the validation set and its average score across all validation samples in the validation set is recorded. This is a progress metric. As such, the parameter space of the models for encoder 102, transcoder 104, or both are not updated in this case. If the score is satisfactory, training may end. If not, training resumes.

Training can continue for several epochs, with validation at the end of each epoch. At the end of training, the trained model is finally evaluated on the held-out test dataset.

The test dataset is a separate set of audio and transcript pairs used to estimate model performance on new samples as a proxy for production performance.

System Application-Schematic Diagram

Figure 2:
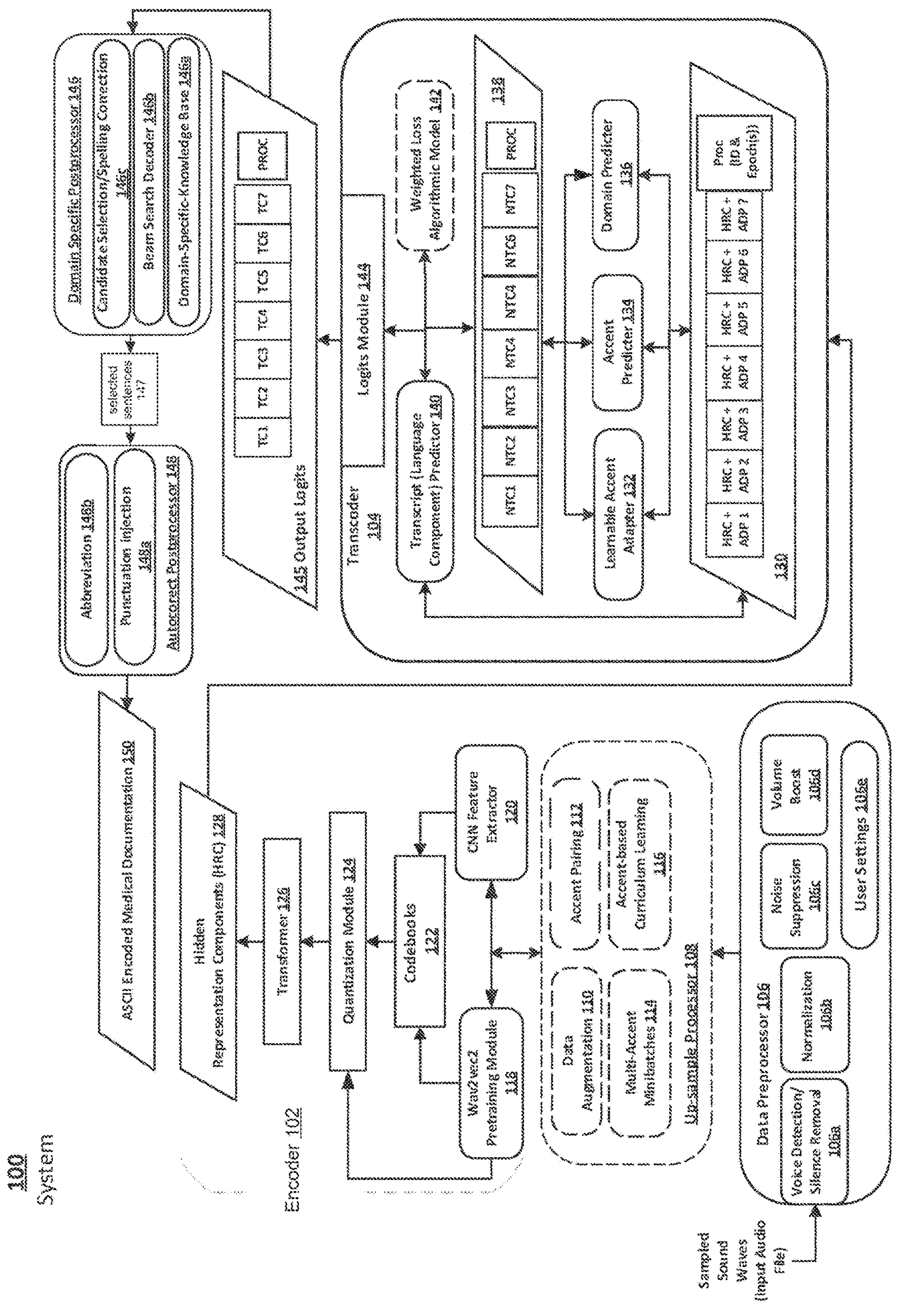
FIG. 2 illustrates a schematic diagram of a system application for encoding and transcribing audio samples and transcripts, and for training a statistical based mathematical algorithm using a training dataset, according to an example embodiment.

Referring now to FIG. 2, illustrated is a schematic diagram of a system application 100 for encoding and transcribing audio samples and transcripts, and for training a statistical based machine learning algorithm using a training dataset, according to example embodiments. In the first embodiment, system application 100 encodes, transcodes, and postprocesses accented audio samples using a trained neural network to produce a text transcript. In the second embodiment, system application 100 uses minibatches (subsets) of the training dataset to train, validate, and test the neural network.

System application 100 can accurately transcribe audio samples of a spoken language having foreign accent, dialect, domain, and sub-domain components using a system of specially trained models.

System Application—Production Environment

System 100 comprises encoder 102, transcoder 104 without weighted loss algorithm 142, data preprocessor 106, domain specific postprocessor 146, and autocorrect postprocessor 148, according to an example embodiment.

In production, system 100 receives audio samples and detects first language, second language, predicts accent, dialect, and domain, e.g., medical, commercial law, or general (non-domain related) from encoded audio samples and accurately transcribes the encoded audio into written form. As an example, the audio samples can comprise voice data of individuals that speak English as a second language that is encoded with the modulated effects of a low resource language, such as certain African languages. In some embodiments, the audio samples may comprise voice data from native English speakers and non-native English speakers.

Data preprocessor 106 can comprise voice detection and silence removal module **106*a*, normalization module 106*b*, noise suppression module 106*c*, volume boost module 106*d*, user settings module 106*e*, or any combination thereof. In some embodiments, data preprocessor 106** can be configured to label audio samples by domain, sub-domain, non-domain related, or any combination thereof.

Voice detection and silence removal module **106*a* can separate voice from non-voice signal and remove leading, trailing, and intermediate segments of silence. Normalization module 106*b* can transform audio amplitude values to a range between −1 and 1 by mean centering. Noise suppression module 106*c* can identify start and end of voice signals and suppresses amplitude of non-voice segments. Volume boost module 106*d* can uniformly increase decibel values. User settings module 106*e* can be configured to code audio samples with domain tags, sub-domain tags, non-domain tags, language tags, accent tags, and dialect tags. User settings module 106*e* can also be configured to select which data processor 106 modules to use and which upsample processor modules 108 to use. User settings module 106*e*** can also be configured to select the system to operate using the trained models, to train the mathematical algorithms, or both.

Production Version of Encoder

Encoder 102 comprises an algorithmic model, such as a deep neural network, that has been trained in a manner that improves sampling distribution for underrepresented variables, e.g., low resource languages. Wav2vec 2.0 is an example of a statistical based algorithmic model that is biased towards underrepresented variables. Encoder 102 is an improved version of wav2vec 2.0 or improves upon wav2vec 2.0. Whisper, MMS, UMS or other high-performance encoders can be used in place of wav2vec 2.0.

Encoder 102 comprises Convolutional Neural Network (CNN) feature extractor 120, codebooks 122, quantization module 124, transformer architecture 126, and hidden representations data structure 128. Encoder 102 generates Hidden Representation Components 124 generated by encoder 102 comprise latent baseband (information bearing) and carrier components, such as language, artifact, such as noise or jitter, dialect, accent, domain, tone or rhythm, and carrier parameters.

Production Version of Transcoder

Transcoder 104 comprises learnable accent adapter 132, accent predicter 134, domain predicter 136, transcript predicter 140, weighted loss algorithm 142, and output logits data 122. Transcoder 104 applies an accent predictor model and a domain predictor model to generate accent, dialect, and domain predictions. The predictions and hidden representation are combined and fed through the learnable accent layer (attention) 132. The output of 132 is then fed as input to transcript predictor 140. Transcript predictor 140 applies a classification layer to the combination of hidden representations and predictions to predict language component parts. This process can be iterative, e.g., based on proc to properly construct sentences, paragraphs, etc.

Learnable accent adapter module 132 is implemented as an attention layer using dot production attention or a fully connected layer. It takes the hidden representation 130 as query, and the output of the accent predicter 134 and domain predicter 136 as keys, and computes attention scores, thus dynamically selecting which sub-components of 136 and 134 are highly valuable for the transcript predictor 140. It then computes a weighted sum of the attention scores with 130 to produce output 138. 138 is fed into 140 which is a classification layer.

Transcript predictor 140 uses a classification or fully connected layer and vectors 138 to predict possible outcomes for each HRC+ ADP, all HRC+ ADP 1-7, or both, which are unnormalized logits 144. Transcript predictor 140 can normalize the possible outcomes using a softmax algorithm (normalized exponential function). Transcript predictor 140 normalizes the vectors 130 to a probability distribution of possible outcomes based on a character set. Normalized Transcribed Components (NTC 1-7) 138 comprises a data structure of possible outcomes, scores, or both. Each component (1-7) of NTC 138 can be a symbol, token, character, syllable, constant, vowel, word, phrase, sentence, paragraph, or any combination thereof. Transcript predictor 140 can return outcomes and scores for each epoch of a proc.

Domain specific postprocessor 146 comprises domain-specific knowledge base/corpus **146*a*, beam search decoder 146*b*, and candidate selection and spelling correction module 146*c*. Autocorrect postprocessor 148 comprises punctuation injection module 148*a* and abbreviation expansion and contraction module 148*b*. Postprocessor 148 performs editing functions on the output of output transcript 147** based on various word processing features.

Domain specific postprocessor performs the function of candidate selection and spelling correction. It leverages a language model **146*c* trained on domain-specific knowledge base 146*a***. The language model learns the probability of sequence of words from the knowledge base. It can thus determine if a candidate sequence is highly likely or less likely given the domain.

Beam search decoder **146*b* leverages this knowledge. The beam search algorithm generates several candidate sentences based on logits 145. It then uses the language model 146***c* to score each of the candidate sequences and selects the most likely sequence/sentence given the domain.

Domain-specific, candidate selection and spelling correction module 146*c* uses a language specific domain, language specific sub-domain, or both knowledge base to correct spelling and computes the probability of each candidate sentence. Module 146*c* selects one or more sentences with the highest probability. Module 146*c* assigns a low probability to candidate sequences with misspellings, and thus prefers sentences with more correct spellings. The spelling correction is thus contextual, which is superior to a dictionary lookup. Punctuation injection module 148*a* improves the coverage of punctuations by replacing instances of speech commands like "semi colon" with ";", "new paragraph" with double new line spacing, "asterisk" with "*", "hashtag" with #, and so on.

Post-transcription, some words may be expressed in full or abbreviated form based on the patterns in the training data. These abbreviations or expansions may not be typical at all hospitals. Abbreviation expansion and contraction module 148*b* comprises a heuristics engine where keywords or abbreviations are replaced with more appropriate expansions or abbreviations e.g. "milligram" is shortened to "mg", "q.i.d" becomes "qds", "pt" becomes "patient", and so on.

Transcribed, edited, and proofed select sentences 147 are written to a file as transcribed documentation 150, such as medical documentation, and used in the setting, e.g., medical diagnostics records, intended.

System Application—Training (Development) and Testing Environment

System 100 comprises encoder 102, transcoder 104 with weighted loss algorithm 142, data preprocessor 106, up-sample processor 108, domain specific postprocessor 146, and autocorrect postprocessor 148, according to an example embodiment.

In development and testing, system 100 trains various models to detects first language, second language, predict accents, predict dialects, language-specific domains, and language-specific subdomains from encoded audio samples and accurately transcribes into written form. As an example, the audio samples can comprise voice data of individuals that speak English as a second language that is encoded with the modulated effects of a low resource language, such as certain African languages. In some embodiments, the audio samples may comprise voice data from native English speakers and non-native English speakers.

A dataset can comprise a corpus of text that can be used to train the various algorithms of transcoder 102, encoder 104, domain-specific postprocessor 146, or any combination thereof. The dataset can be curated based on domain-specific words classified as clinical and legal words and categorized as pediatrics, geriatrics, dental surgery, internal medicine, oncology, radiology, obstetrics, gynecology, pathology, pharmacology, surgery, nursing, human anatomy, human physiology, human physiology, laboratory medicine, embryology, and ultrasonography.

Data preprocessor 106 can comprise voice detection and silence removal module 106*a*, normalization module 106*b*, noise suppression module 106*c*, volume boost module 106*d*, user settings module 106*e*, or any combination thereof. In some embodiments, data preprocessor 106 can be configured to label audio samples by domain, sub-domain, non-domain related, or any combination thereof.

Voice detection and silence removal module 106*a* can separate voice from non-voice signal and remove leading, trailing, and intermediate segments of silence. Normalization module 106*b* can transform audio amplitude values to a range between −1 and 1 by mean centering. Noise suppression module 106*c* can identify start and end of voice signals and suppresses amplitude of non-voice segments. Volume boost module 106*d* can uniformly increase decibel values. User settings module 106*e* can be configured to code audio samples with domain tags, sub-domain tags, non-domain tags, language tags, accent tags, and dialect tags. User settings module 106*e* can also be configured to select which data processor 106 modules to use and which up-sample processor modules 108 to use. User settings module 106*e* can also be configured to select the system to operate using the trained models, to train the mathematical algorithms, or both.

Up-sample processor 108 can comprise data augmentation module 110, accent pairing module 112, multi-accent minibatches module 114, accent-based curriculum learning module 116, or any combination thereof.

Data augmentation module 110 includes a white noise overlay module, a gain perturbation module, a time masking module, a fade in and fade out module, a time shift module, a pitch shift module, and a time stretch module. Data augmentation module 100 improves model robustness of encoder 102 to varying user conditions like background noise during production usage.

The white noise overlay module can overlay 10% of samples with gaussian noise. The background noise overlay module can overlay 20% of samples with real-world noise samples. The gain perturbation module can randomly perturb volume of 15% of samples. The time masking module can randomly mask short segments of 10% of samples. The fade in and fade out module can randomly fade in/out the first 2 seconds of 15% of audio samples. The time shift module can randomly shift start and end positions of 10% of samples. The pitch shift module can randomly perturb the pitch of 10% of samples. The time stretch module can randomly speed up or slow down the clip speed for 30% of samples.

Up-sample algorithms 108—Accent pairing module 112, multi-accent minibatches module 114, and accent-based curriculum learning module 116—are three different methods of training the encoder's statistics-based algorithm. The modules 112, 114, and 116 can be used independently of one another.

Figure 5:
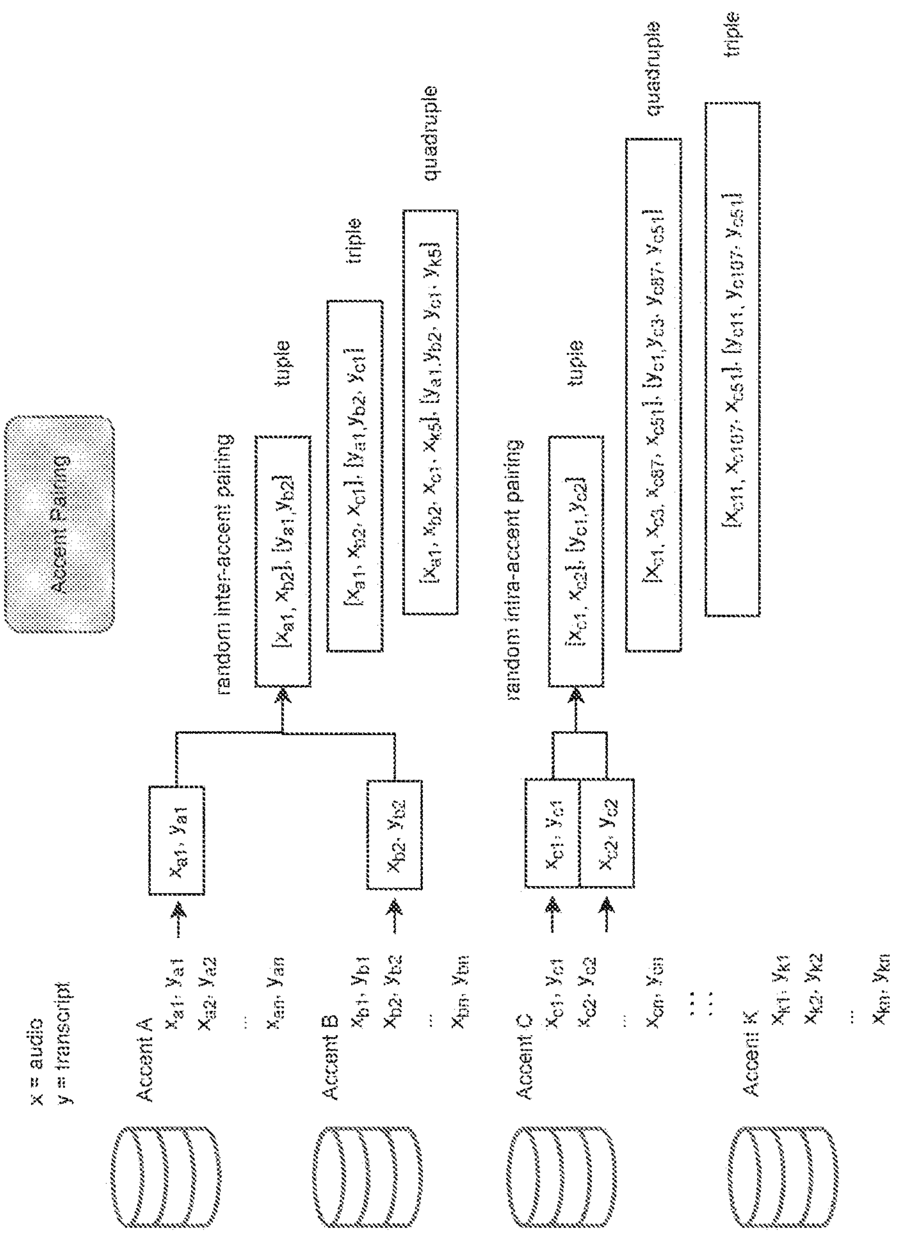
FIG. 5 illustrates a process flow diagram of accent pairing, according to an example embodiment.

Accent pairing module 112, shown in FIG. 5, comprises an algorithm configured to leverage accents, dialects, or both to augment the associated audio samples of minority accents in the training dataset. Accent pairing module 112 is configured to create accent pairs from the preprocessed audio samples based on the detected accents, dialects, or both. As an example, short samples (less than 3-5 secs) from a specific accent are paired with short samples of the same accent (matched accent pairs), or short samples from different accents or dialects can be paired (mismatched accent pairs) to create novel audio samples. In either case, corresponding audios and transcripts are concatenated to create a new sample representing the speech and transcripts of both parent samples. The approach expands the training dataset (augmentation) and prevents (regularizes) encoder 102 from overfitting its statistics-based algorithm to majority accents.

As shown in FIG. 5, accent pairing can combine samples in tuples, triples, or quadruples of matched or mismatched pairs. For example, up to 4 short samples of the same accent, dialect or second language can be combined to create a novel sample. Likewise, up to 4 mismatched samples can be combined. At full capacity, this approach has the unique ability to combinatorially explode the size of the training data, creating billions of novel examples that improve the robustness of the model to multiple accents. When carefully applied to minority accents, it is an effective tool for increasing the representation of these rare accents to match majority accents.

Accent pairing module 112 improves the encoder's trained model by regulating its fitting during training. This makes it more robust, regulates fitting, and improves generalization of the resulting algorithmic model.

Multi-accent minibatches module 114 comprises an algorithmic model configured to leverage accents, dialects, or both and regulate the composition of associated audio samples in each minibatch. Module 114 is configured to create minibatches (training data subsets to be iteratively fed into the model) by randomly sampling M number of audio samples from a batch or epoch of N samples. To prevent the minibatches from having an overrepresentation of majority accents and underrepresentation of minority accents caused by random sampling, module 114 can use a multinominal distribution function to select representative accents for each minibatch. With a multinomial distribution, minority accents have an equal chance of being selected into each minibatch. However, the number of samples of each accent selected for each minibatch is based on their relative representation in the dataset. The approach controls the importance given to high resource versus low-resource accents. This effectively up-samples the minority accents at the minibatch level. The effect of the up sampling is that the fitting process of the encoder's statistics-based algorithm (deep neural network) is controlled in a manner so that the training samples/minibatches include sufficient representations of minority accents to properly train the algorithm.

Multi-accent minibatches module 114 improves the encoder's trained model by regulating its fitting during training. This makes it more robust and improves generalization of the resulting algorithmic model. Overall, it improves the encoder's ability to recognize language components from minority accents, dialects, and languages and generates more informative hidden representations.

Figure 6:
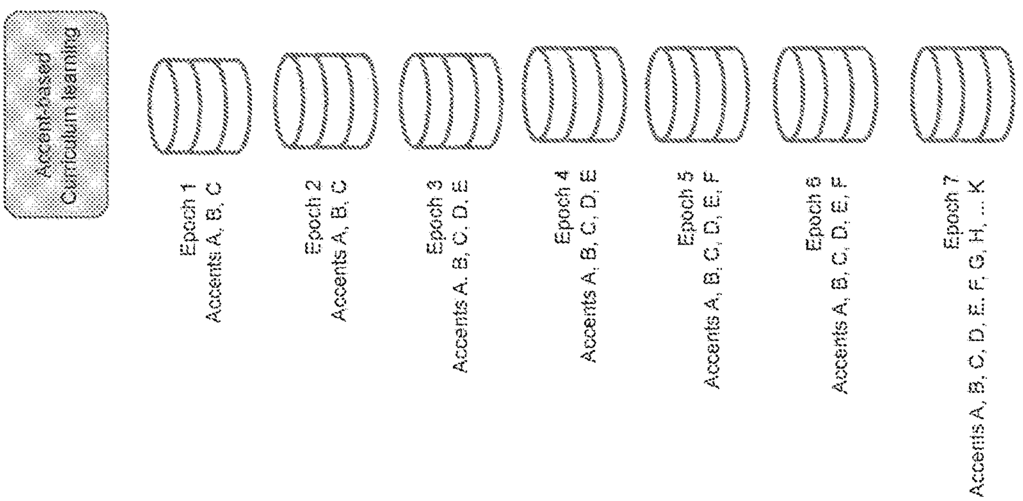
FIG. 6 illustrates a process flow diagram of accent-based curriculum learning, according to an example embodiment.

Accent-based curriculum learning module 116, as shown in FIG. 6 comprises an algorithmic model configured to leverage accents, dialects, or both and regulate the selection of associated audio samples for training. Module 116 is configured to manage minibatches per epoch. For the first 40% of epochs, majority accents will make up 80% of minibatches. For the next 30% of epochs, majority accents will make up 60% of minibatches. For the final 30% of epochs, majority and minority accents will each make up 50% of each minibatch. During initial epochs, this effectively pretrains the model on the majority accents where there are large amounts of data. In later epochs, minority accents can leverage the pretrained encoder parameters to boost transcription accuracy. FIG. 6 illustrates accents (A-K) and associated epochs, according to an example embodiment.

Training (Development) and Testing Version of Encoder

The statistical based algorithmic model of encoder 102 is a Wav2vec 2.0 model or similar deep neural network or transformer-based feature extractor.

Encoder 102 comprises an algorithmic model, such as a deep neural network, that has been trained in a manner that improves sampling distribution for underrepresented variables, e.g., low resource languages. Wav2vec 2.0 is an example of a statistical based algorithmic model that is biased towards underrepresented variables. Encoder 102 is an improved version of wav2vec 2.0.

Encoder 102 comprises Convolutional Neural Network (CNN) feature extractor 120, codebooks 122, quantization module 124, transformer architecture 126, and hidden representations data structure 128. Hidden Representation Components 128 generated by encoder 102 comprise latent baseband (information bearing) and carrier components, such as language, artifact, such as noise or jitter, dialect, accent, domain, tone or rhythm, and carrier parameters.

Encoder 102 comprises wav2vec2 module 118, or other deep neural or transformer-based feature extractor, Convolutional Neural Network (CNN) feature extractor 120, codebooks 122, quantization module 124, transformer architecture 126, and hidden representations data structure 128.

Encoder acoustic model 102 applies feature learning techniques and hidden layers of a neural network to automatically learn a character or character set from the audio samples generated by data preprocessing module 106. Hidden representations are the features detected by the hidden layers of the neural network. Wav2vec 2.0 is an example of an architecture that can be used to generate hidden representations. The hidden representations can be d-dimensional vectors of real numbers representing encodings of audio samples.

Training (Development) and Testing Version of Transcoder

Transcoder 104 conditions transcript predictions on the accent predictions and domain predictions to enhance the encoder's neural network model. Transcoder 104 comprises learnable accent adapter 132, accent predicter 134, domain predicter 136, transcript predicter 118, weighted loss algorithm 142, and output logits 144. Transcoder 104 applies an accent predictor model 134 and a domain predictor model 136 to generate accent, dialect, and domain predictions. The predictions and hidden representations are added together and passed through the learnable accent adapter 132 implemented as an attention layer which dynamically combines the inputs using matrix multiplications to produce a vector output. Transcript predictor 118 applies a classification layer to the combination of hidden representations and predictions to predict language component parts. This process can be iterative, e.g., based on proc to properly construct sentences, paragraphs, etc.

Transcoder 104 represents a multi-task decoder as described below:

Accent predictor module 134 comprises a statistical based mathematical algorithm having a parameter space that can be trained to predict accents. Accent predictor is a classification layer with a softmax that predicts the correct accent based on the encoder hidden representation.

Domain predictor 136 is a classification layer with a softmax that predicts the correct domain/sub-domain based on the encoder hidden representation.

The addition of these 2 tasks to the speech recognition task makes the entire Encoder/Transcoder a multi-task architecture (model). This means the model is designed to perform multiple tasks, in this case 3 tasks, in combination. The goal is to leverage the learning of each task to improve collective performance.

Learnable accent adapter module 132 is implemented as an attention layer using dot production attention or a fully connected layer. It takes the hidden representation 130 as query, and the output of the accent predicter 134 and domain predicter 136 as keys, and computes attention scores, thus dynamically selecting which sub-components of 136 and 134 are highly valuable for the transcript predictor 140. It then computes a weighted sum of the attention scores with 130 to produce output 138. 138 is fed into 140 which is a classification layer.

The in-training algorithm is not configured with how it should use the accent or domain prediction, but rather it is configured to iteratively learn the optimal combination of both vectors and a language component of hidden representations 128 based on error (or accuracy) of previous predictions. This technique allows the trained model to dynamically select (or attend to) parts of the hidden representation and accent prediction that are most valuable for correctly transcribing each audio input.

Transcript predictor 140 uses a classification or fully connected layer and vectors 138 to predict possible outcomes for each HRC+ ADP, all HRC+ ADP 1-7, or both, which are unnormalized logits 144. Transcript predictor 140 can normalize the possible outcomes using a softmax algorithm (normalized exponential function). Transcript predictor 140 normalizes the vectors 130 to a probability distribution of possible outcomes based on a character set. Normalized Transcribed Components (NTC 1-7) 138 comprises a data structure of possible outcomes, scores, or both. Each component (1-7) of NTC 138 can be a symbol, token, character, syllable, constant, vowel, word, phrase, sentence, paragraph, or any combination thereof. Transcript predictor 140 can return outcomes and scores for each epoch of a proc.

Vectors 130 comprise HRC's adjusted by accent predictor values (A) and domain predictor values (D), generated by accent predictor 134 and domain predictor 136, respectively. Normalized Transcribed Components (NTC 1-7) 138 comprises a data structure of possible outcomes, scores, or both. Each component (1-7) of NTC 138 can be a symbol, token, character, syllable, constant, vowel, word, phrase, sentence, paragraph, or any combination thereof. Transcript predictor 140 can return outcomes and scores for each epoch of a proc.

Transcript predictor 140 uses one or more text corpus, vectors 130, and vector autoregression analysis to predict possible outcomes for each HRC+ ADP, all HRC+ ADP 1-7, or both. Transcript predictor 140 can normalize the possible outcomes using a softmax algorithm (normalized exponential function).

Vectors 130 comprise HRC's iteratively adjusted by accent predictor values (A) and domain predictor values (D), generated by accent predictor 134 and domain predictor 136, respectively. Normalized Transcribed Components (NTC 1-7) 138 comprise a data structure of possible outcomes, scores, or both. Each component (1-7) of NTC 138 can be a symbol, token, character, syllable, constant, vowel, word, phrase, sentence, paragraph, or any combination thereof. Transcript predictor 140 can return outcomes and scores for each epoch of a proc.

The weighted loss is the weighted sum of the accent prediction loss, the domain prediction loss, and the transcript prediction loss. Backpropagation is performed on vectors 130 using the weighted sum.

Algorithm 142 checks the correct answer for each task (accent and domain), computes the loss on each task, takes a weighted combination of the 3 losses, aggregates it across the minibatch to compute the cost, and uses that combined cost to drive back-propagation (weight updates) by taking the derivative of each parameter with respect to the cost.

Domain specific postprocessor 146 comprises domain-specific knowledge base dataset 146*a*, beam search decoder module 146*b*, and candidate selection and spelling correction 146*c*.

Domain-specific and knowledge base dataset(s) module 146*a* provides a domain specific corpus, knowledge base, or both from database 14 for training postprocessor models.

Domain specific postprocessor 146 can be trained separately from or in combination with transcoder 104 or could be trained in combination. Where they are trained separately, the training loop ends at 138. The loss computed in 142 is the signal used to update all the training parameters using derivatives and backpropagation. Data 138 is the raw transcript of the transcoder.

In production, 144 is fed to 146 to improve the quality (autocorrect) based on the domain.

Where postprocessor 146 and transcoder 104 are trained in combination, 147 (language model output) can be sent to weighted loss algorithm 142 instead of 138.

Beam search decoder 146*b* leverages a model having a parameter space trained using domain-specific knowledge base/corpus 146*a*. Beam search decoder 146*b* evaluates output logits 145 and predicts one or more candidate sentences and determines scores for each prediction. Beam search decoder 146*b* selects the top k hypothesis (predictions) for each time step (epoch). Beam search decoder 146*b* also creates several alternative sequences, pruning the lowest probability combinations to maintain a maximum of k candidate sequences.

Candidate selection and spelling correction module 146*c* comprises a language model for each domain and subdomain. Each language model is trained to understand the probability of a word sequence given a large knowledge base of sentences. Each domain-specific language model computes the probability of each candidate sentence and selects the sentence with the highest probability. For spelling correction, the LM assigns a low probability to candidate sequences with misspellings, and thus prefers sentences with more correct spellings. The spelling correction is thus contextual, which is superior to a naïve dictionary lookup.

Autocorrect postprocessor 148 performs editing functions on the output of output logits 110 based on various word processing features. Autocorrect postprocessor comprises punctuation injection module 148*a* and abbreviation module 148*b*. Modules 148*a* and 148*b* perform abbreviation expansion, contraction, and punctuation injection operations on the k candidate sequences.

Transcribed, edited, and proofed selected sentences 147 are written to files as transcribed documentation 150, such as medical documentation, that can be reviewed, tagged, documented, evaluated, and stored for historical purpose.

Methods of Operation

Figure 3:
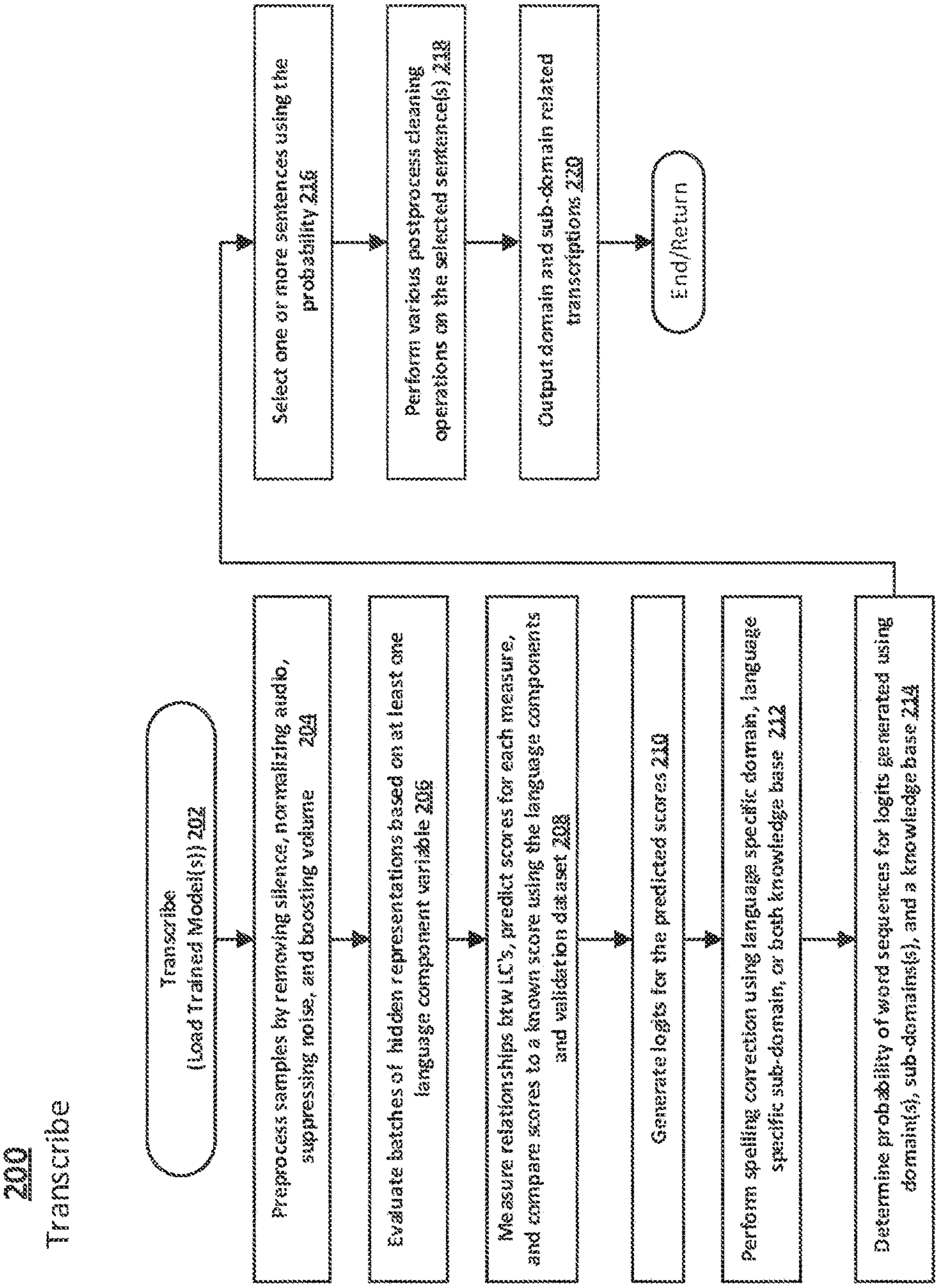
FIG. 3 illustrates a process flow diagram of an algorithmic (statistical based) model 200 for encoding and transcoding audio data comprising language, according to an example embodiment.

Referring now to FIG. 3, illustrated is a process flow diagram of an algorithm 200 for encoding and transcoding audio data comprising language, accent, domain specific components, according to an example embodiment.

Algorithm 200 can be executed manually by a user or voice activated, e.g., using a particular code word. At block 202, trained models are loaded upon command and audio samples preprocessed at block 204. The audio samples are preprocessed by, e.g., by removing silence, normalizing audio, suppressing noise, and boosting volume.

At block 206, algorithm 200 evaluates batches of audio samples encoded in hidden representations based on at least one language component variable.

At block 208, algorithm 200 measures relationships between language components, predicts scores for each measure, and compares scores to known scores using the language components and validation dataset.

At block 210, algorithm 200 generates logits for the predicted scores.

At block 212, algorithm 200 performs spelling correction using language specific domain, language specific subdomain, or both knowledge base using blocks 214 and 216 described below.

At block 214, algorithm 200 determines probability of word sequences for the spelling corrected logits. The probabilities are generated using domain(s), sub-domains(s), and a knowledge base 212.

At block 216, algorithm 200 selects one or more sentences using the probabilities.

At block 218, algorithm 200 performs various postprocess cleaning operations, such as abbreviation expansion, on the selected sentence(s).

At block 220, domain and sub-domain related transcriptions are generated using the cleaned, selected sentences.

Algorithm 200 can terminate, e.g., based on a designated token, or return to continue processing audio samples.

Figure 4:
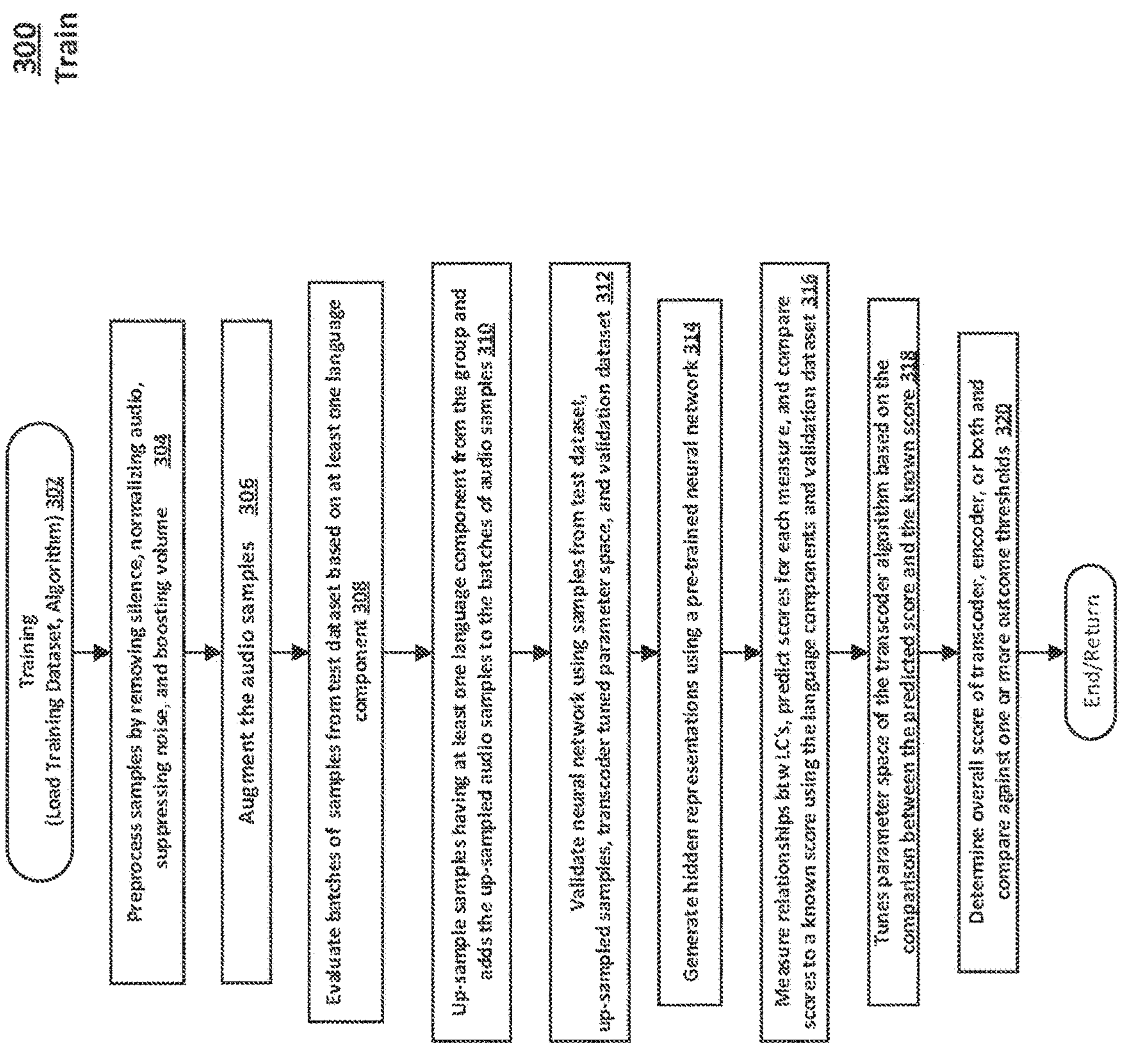
FIG. 4 illustrates a process flow diagram of a training module 300 for training a mathematical algorithm for transcoder 104, according to an example embodiment.

Referring now to FIG. 4, illustrated is a process flow diagram of a training module 300 for training a mathematical algorithm for transcoder 104, according to an example embodiment.

Training algorithm 300 begins at block 302 where a training dataset and statistical based mathematical algorithm having a parameter space is loaded or otherwise initiated by the user. The training dataset comprises audio samples having high resource and low resource language components.

At block 304, training module 300 preprocesses the audio samples by removing silence from audio samples, normalizing the audio samples, suppressing noise in the audio samples, and boosting volume.

At block 306, training module 300 augments the audio samples by overlaying the audio sample with a white noise; randomly perturbing volume of audio samples; randomly mask short segments of audio samples; randomly fade in and fade out a percentage of audio samples at a predetermined period; randomly shift start and end positions of a percentage of samples; randomly perturb pitch of a percentage of audio samples; and randomly speed up or slow down clip speed for a percentage of audio samples.

At block 308, training module 300 reviews the domain/accent/dialect/etc. metadata of the audio samples in the training set in preparation for block 310 where the metadata will be used for up-sampling.

At block 310, training module 300 up-samples audio samples having at least one language component from the group and adds the up-sampled audio samples to the batches of audio samples.

At block 314, minibatches of training data (audios+accent/domain/dialects/etc.) are passed to the model. Only audios are passed to the encoder. The encoder generates hidden representations using the encoder or neural network as feature extractor.

At block 316, transcoder 104 takes as input, the output (hidden representation) of encoder 102. Training module 300 generates three predictions-transcript, domain, & accent. The three predictions retrieved in the corrected block 308 are compared to the true language components (true transcript, domain, accent) of each audio. The difference or delta between each corresponding prediction and true label represents the transcript loss, the domain loss, and accent loss. These are combined to create a single loss score, aggregated across the minibatch as the cost. The loss is the difference between the expected probability of the true or correct label, e.g., 1.0, and the probability predicted by the model, e.g., between 0 and 1. The losses across several samples or predictions are summed from the training set. The combined losses are called the cost.

At block 318, training module 300 tunes the parameter space of the transcoder's 104 algorithm based on the comparison. The minibatch cost computed at block 316 from the training samples is used as a signal to update encoder's 102 neural network's parameter space. Each parameter or weight in the network is updated by shifting it by a very small amount in the direction that reduces the overall cost. Multiple such updates gradually train the network, improving its prediction accuracy over the training set.

After block 320, at regular intervals or at the end of each training epoch (meaning a pass through the entire training set), training is paused, the validation set is loaded and passed to the model. The model predicts over all validation audios returning its predicted transcript, accent, and domain for each audio. These are compared to the true transcript, accent, and domain and a weighted loss is computed. Accuracy (or word error rate) is also computed. The average loss (and average accuracy) over the entire validation dataset is the main progress metric for the training process.

Algorithm 200 can terminate, e.g., based on a designated token, or return to continue processing audio samples.

Diagram—General and/or Special Purpose Computer

Figure 7:
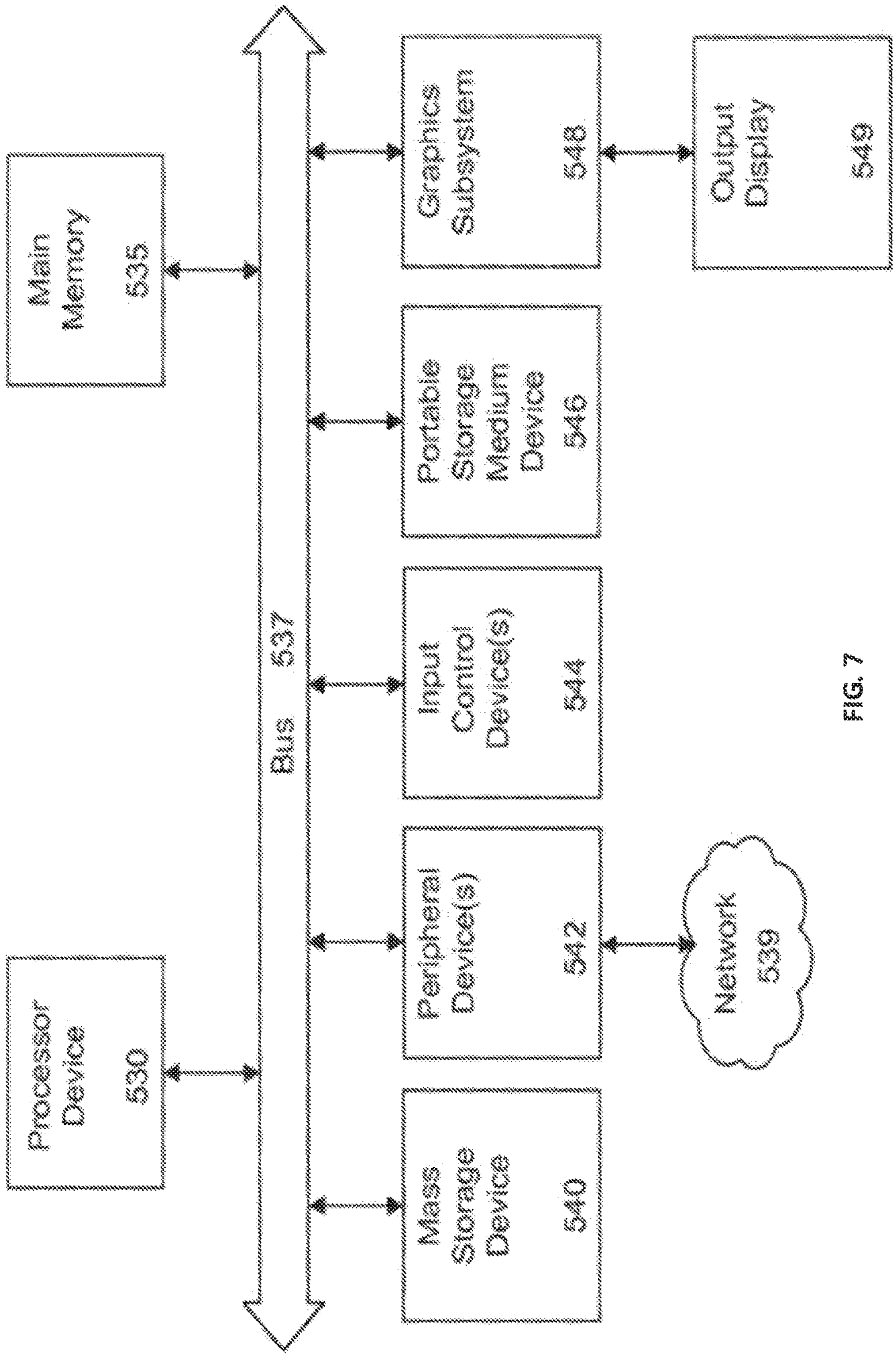
FIG. 7 illustrates a block diagram of a general computer and/or special purpose computer and/or computing device, according to some of the example embodiments.

FIG. 7 is a block diagram of a general and/or special purpose computer 500, which may be a general and/or special purpose computing device, in accordance with some of the example embodiments of the invention. The computer 500 may be implemented as a conventional computer system, an embedded controller, a laptop, a server, a mobile device, a smartphone, a wearable computer, a set-top box, a kiosk, a vehicular information system, one more processors associated with a television, a customized machine, any other hardware platform, or any combination or multiplicity thereof. Computer 500 may be a distributed system configured to function using multiple computing machines interconnected via a data network or bus system.

Computer 500 may include without limitation a processor 530, a graphics processing unit (GPU), Application Specific Integrated Circuit (ASIC), or any combination thereof. Computer 500 may also include a main memory 535, and an interconnect bus 537. The processor 530 may include without limitation a single microprocessor or may include a plurality of microprocessors for configuring the computer 500 as a multi-processor system.

Processor 530 may be configured to execute code or instructions to perform the operations and functionality described herein, manage request flow and address mappings, and to perform calculations and generate commands. Processor 530 may be configured to monitor and control the operation of the components in computer 500. Processor 530 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof.

Processor 530 may be a single processing unit, multiple processing units, a single processing core, multiple processing cores, special purpose processing cores, co-processors, or any combination thereof. According to certain embodiments, processor 530 along with other components of computer 500 may be a virtualized computing machine executing within one or more other computing machines.

The main memory 535 stores, among other things, instructions and/or data for execution by the processor 530. The main memory 535 may include banks of dynamic random-access memory (DRAM), as well as cache memory.

The computer 500 may further include a mass storage 540, peripheral device(s) 542, non-transitory storage medium device(s) 546, input control device(s) 544, a graphics subsystem 548, and/or a display 549. For explanatory purposes, all components in computer 500 are shown in FIG. 7 as being coupled through bus 537. However, computer 500 is not so limited. Devices and systems of the computer 500 may be coupled through one or more data transport means. For example, processor 530 and/or the main memory 535 may be coupled through a local microprocessor bus. Mass storage 540, peripheral device(s) 542, portable storage medium device(s) 546, and/or graphics subsystem 548 may be coupled via one or more input/output (I/O) buses.

Mass storage 540 may include a hard disk, a floppy disk, a compact disc read-only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof.

Mass storage 540 may store one or more operating systems, application programs and program modules, data, or any other information. Mass storage may be part of, or connected to, computer 500. Mass storage 540 may also be part of one or more other computing machines that are in communication with computer 500, such as servers, database servers, cloud storage, network attached storage, and so forth.

Portable storage medium device 546 operates in conjunction with a nonvolatile portable storage medium, such as, for example, a compact disc read only memory (CD-ROM), to input and output data and code to and from computer 500. In some embodiments, the software for storing information may be stored on a portable storage medium and may be inputted into computer 500 via portable storage medium device 546.

Peripheral device(s) 542 may include any type of computer support device, such as, for example, an input/output (I/O) interface configured to add additional functionality to computer 500. For example, peripheral device(s) 542 may include a network interface card for interfacing computer 500 with network 539.

Input control device(s) 544 provides a portion of the user interface for a user of computer 500. Input control device(s) 544 may include a keypad and/or a cursor control device. The keypad may be configured for inputting alphanumeric characters and/or other key information. The cursor control device may include, for example, a handheld controller or mouse, a trackball, a stylus, and/or cursor direction keys. To display textual and graphical information, computer 500 may include graphics subsystem 548 and output display 549. Output display 549 may include a cathode ray tube (CRT) display and/or a liquid crystal display (LCD). Graphics subsystem 548 receives textual and graphical information and processes the information for output-to-output display 549.

Computer 500 may operate in a networked environment using logical connections through network 539 to one or more other systems or computing machines across network 539. Network 539 may include wide area networks (WAN), local area networks (LAN), intranets, the Internet, wireless access networks, wired networks, mobile networks, telephone networks, optical networks, or combinations thereof.

Network 539 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

Each component of computer 500 may represent a broad category of a computer component of a general and/or special purpose computer. Components of computer 500 are not limited to the specific implementations provided here.

Software embodiments of the example embodiments presented herein may be provided as a computer program product, or software, that may include an article of manufacture on a machine-accessible or machine-readable medium having instructions. The instructions on the non-transitory machine-accessible machine-readable or computer-readable medium may be used to program a computer system or other electronic device. The machine- or computer-readable medium may include, but is not limited to, floppy diskettes, optical disks, CD-ROMs, and magneto-optical disks or other types of media/machine-readable medium suitable for storing or transmitting electronic instructions. The techniques described herein are not limited to any software configuration. They may find applicability in any computing or processing environment. The terms "computer-readable", "machine-accessible medium" or "machine-readable medium" used herein shall include any medium that is configured for storing, encoding, or transmitting a sequence of instructions for execution by the machine and that causes the machine to perform any one of the methods described herein. Furthermore, it is common in the art to speak of software, in one form or another (e.g., program, procedure, process, application, module, unit, logic, and so on), as taking an action or causing a result. Such expressions are merely a shorthand way of stating that the execution of the software by a processing system causes the processor to perform an action to produce a result.

Portions of the example embodiments of the invention may be conveniently implemented by using a conventional general-purpose computer, a specialized digital computer and/or a microprocessor programmed according to the teachings of the present disclosure, as is apparent to those skilled in the computer art. Appropriate software coding (instructions) may readily be prepared by skilled programmers based on the teachings of the present disclosure.

Some embodiments may also be implemented by the preparation of application-specific integrated circuits, field programmable gate arrays, or by interconnecting an appropriate network of conventional component circuits.

Some embodiments include a computer program product. The computer program product may be a storage medium or media having instructions stored thereon or therein which can be used to control, or cause, a computer to perform any of the procedures of the example embodiments of the invention. The storage medium may include without limitation a floppy disk, a mini disk, an optical disc, a Blu-ray Disc, a DVD, a CD or CD-ROM, a micro-drive, a magneto-optical disk, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer readable medium or media, some implementations include software for controlling both the hardware of the general and/or special computer or microprocessor, and for enabling the computer or microprocessor to interact with a human user or other mechanism utilizing the results of the example embodiments of the invention. Such software may include without limitation device drivers, operating systems, and user applications. Ultimately, such computer readable media further includes software for performing example aspects of the invention, as described above.

Included in the programming and/or software of the general and/or special purpose computer or microprocessor are software modules for implementing the procedures, methods, processes, algorithms, and models described above.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. For instance, although the flowcharts depict a serial process, some of the steps/processes may be performed in parallel or out of sequence or combined into a single step/process. The scope of the claims is intended to broadly cover the disclosed embodiments and any such modification. Further, the following clauses represent additional embodiments of the disclosure and should be considered within the scope of the disclosure:

- Clause 1, a method of training a transcoder algorithm having a parameter space using a training dataset comprising audio samples having high resource and low resource language components, the method comprising: by one or more computing devices; selecting batches of audio samples for a training dataset based on at least one language component selected from a group consisting of accent, dialect, accented and language specific domain, accented and language specific subdomain, dialect and language specific domain, dialect and language specific subdomain; up-sampling audio samples having at least one language component from the group; adding the up-sampled audio samples to the batches of audio samples to improve representation of minority samples; generating hidden representations using a neural network; predicting scores for each task—transcript, accent, and domain; measuring delta between predictions and true labels (language component, accent, dialects, domain, sub-domains) variables in the batches of audio samples; computing a weighted loss across all tasks; and tuning the parameter space of the transcoder algorithm based on the comparison between the predicted score and the known score;
- Clause 2, the method of clause 1, further comprises preprocessing the batches of audio samples performing at least one selected from a group consisting of: overlaying audio sample with a white noise; randomly perturbing volume of audio samples; randomly mask short segments of audio samples; randomly fade in and fade out a percentage of audio samples at a predetermined period; randomly shift start and end positions of a percentage of samples; randomly perturb pitch of a percentage of audio samples; and randomly speed up or slow down clip speed for a percentage of audio samples;
- Clause 3, the method of any of the preceding clauses, wherein up-sampling the audio samples further comprises grouping audio samples based on one or more accent types, and generating novel low resource audio samples by creating a plurality of minority audio samples by combining audio samples from at least one grouping to improve the representation of minority audio samples during training;
- Clause 4, the method of any of the preceding clauses, wherein up-sampling the audio samples further comprises creating minibatches by using a multinominal distribution function to randomly sample audio samples from a batch of audio samples;
- Clause 5, the method of any of the preceding clauses, wherein up-sampling the audio samples further comprises: composing minibatches for each epoch that integrates majority accents in earlier epochs while gradually increase minority accents/dialects/subdomains in later epochs; and regulating minibatches per epoch; and
- Clause 6, the method of dynamically combining accent and domain prediction with hidden representation of audio to contextually predict the best text transcript given the neural networks knowledge of accent, dialect, language, domain or sub-domain.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, steps, operations, elements, and/or components, but do not preclude the presence or addition of one or more other features, steps, operations, elements, components, and/or groups thereof. In addition, the steps and components described in the above embodiments and figures are merely illustrative and do not imply that any particular step or component is a requirement of a claimed embodiment.

What is claimed is:

1. A method of training a transcoder algorithm having a parameter space using a training dataset comprising audio samples having high resource and low resource language components, the method comprising:

by one or more computing devices:

- evaluating batches of audio samples from a training dataset based on at least one language component selected from a group consisting of accent, dialect, accented and language specific domain, accented and language specific subdomain, dialect and language specific domain, dialect and language specific subdomain;
- creating, using at least two audio samples from the batches of audio samples, one or more additional audio samples;
- adding the one or more additional audio samples to the batches of audio samples;
- segmenting, the batches of audio samples, into one or more minibatches by sampling the batches of audio samples;
- generating, using a pre-trained neural network, one or more encodings comprising a hidden representation for each audio sample of the one or more minibatches;
- generating, using an accent predictor model, an accent prediction for each audio sample of the one or more minibatches;
- generating, using a domain predictor model, a domain prediction for each audio sample of the one or more minibatches;
- dynamically combining, using a learnable accent adapter implemented as an attention layer, the hidden representation, the accent prediction, and the domain prediction to produce a combined output, wherein the attention layer takes the hidden representation as a query and the accent prediction and the domain prediction as keys and computes attention scores;

generating, using the combined output, one or more transcript predictions for each audio sample of the one or more minibatches;

comparing the one or more transcript predictions for each audio sample of the one or more minibatches to one or more true transcript labels for each audio sample of the one or more minibatches to determine a transcript loss for each audio sample of the one or more minibatches;

comparing the accent prediction for each audio sample of the one or more minibatches to a true accent label for each audio sample of the one or more minibatches to determine an accent loss for each audio sample of the one or more minibatches;

comparing the domain prediction for each audio sample of the one or more minibatches to a true domain label for each audio sample of the one or more minibatches to determine a domain loss for each audio sample of the one or more minibatches;

aggregating, for each audio sample of the one or more minibatches, the transcript loss, the accent loss, and the domain loss as a weighted sum to form an aggregated loss score; and tuning the parameter space of the transcoder algorithm using the aggregated loss score, wherein the generating steps, the comparing steps, and the aggregating step are performed iteratively using the one or more minibatches.

2. The method of claim 1, further comprises preprocessing the batches of audio samples performing at least one selected from a group consisting of:

overlaying audio sample with a white noise; randomly perturbing volume of audio samples; randomly mask short segments of audio samples; randomly fade in and fade out a percentage of audio samples at a predetermined period; randomly shift start and end positions of a percentage of samples; randomly perturb pitch of 10% of audio samples; and randomly speed up or slow down clip speed for a percentage of audio samples.

3. The method of claim 1, wherein creating the one or more additional audio samples further comprises:

concatenating the at least two audio samples from the batches of audio samples into a single new audio waveform, each of the at least two audio samples having a same at least one language component, wherein the single new audio waveform is distinct from a minibatch, a cluster, and a resampled copy of an existing audio sample; or concatenating the at least two audio samples from the batches of audio samples into a single new audio waveform, each of the at least two audio samples having a different at least one language component, wherein the single new audio waveform is distinct from a minibatch, a cluster, and a resampled copy of an existing audio sample.

4. The method of claim 1, wherein the learnable accent adapter dynamically selects, based on the attention scores, sub-components of the accent prediction and the domain prediction that are valuable for generating the transcript predictions.

5. The method of claim 1, further comprising, for each audio sample of the one or more minibatches, weighting the transcript loss, the accent loss, and the domain loss prior to forming the aggregated loss score.

6. The method of claim 1, wherein the segmenting comprises composing minibatches for each training epoch such that majority accents make up a first percentage of the minibatches in earlier epochs and majority accents and minority accents each make up a substantially equal percentage of the minibatches in later epochs.

* * * * *